US012530606B2

(12) United States Patent
Gorshkov et al.

(10) Patent No.: US 12,530,606 B2
(45) Date of Patent: Jan. 20, 2026

(54) PERFORMING STATE REVERSAL ON A QUANTUM SPIN CHAIN

(71) Applicant: Government of the United States of America, as represented by the Secretary of Commerce, Gaithersburg, MD (US)

(72) Inventors: Alexey Vyacheslavovich Gorshkov, Rockville, MD (US); Aniruddha Bapat, College Park, MD (US); Eddie Schoute, College Park, MD (US); Andrew Childs, Bethesda, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 924 days.

(21) Appl. No.: 17/669,946

(22) Filed: Feb. 11, 2022

(65) Prior Publication Data

US 2022/0269966 A1    Aug. 25, 2022

Related U.S. Application Data

(60) Provisional application No. 63/148,662, filed on Feb. 12, 2021.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC .............................. G06N 10/20; G06N 10/40
See application file for complete search history.

(56) References Cited

U.S. PATENT DOCUMENTS

| 8,816,325 | B2 | 8/2014 | Schenkel et al. |
| 9,146,441 | B2 | 9/2015 | Smith et al. |
| 9,270,385 | B2 | 2/2016 | Meyers et al. |
| 11,108,398 | B2 | 8/2021 | Sete et al. |
| 2014/0025926 | A1* | 1/2014 | Yao ................. B82Y 10/00 712/32 |

(Continued)

OTHER PUBLICATIONS

Ovchinnikov, A. A., et al. "Antiferromagnetic Ising chain in a mixed transverse and longitudinal magnetic field." Physical review B 68.21 (2003). (Year: 2003).*

(Continued)

*Primary Examiner* — Omar F Fernandez Rivas
*Assistant Examiner* — Michael C. Lee
(74) *Attorney, Agent, or Firm* — Office of Chief Counsel for National Institute of Standards and Technology

(57) ABSTRACT

Performing state reversal on a quantum spin chain includes: providing qubits in a quantum spin chain in an input state, such that the quantum spin chain includes: first and second terminal qubits and one or more intermediate qubits, such that: the qubits have a transverse field strength; the first and terminal qubits a longitudinal field strength; and nearest neighbor qubit pair has an Ising coupling strength; and evolving the quantum spin chain from the input state to a final state for an evolution period to perform state reversal on the quantum spin chain.

16 Claims, 5 Drawing Sheets

(56) References Cited

U.S. PATENT DOCUMENTS

2019/0027672 A1* 1/2019 Megrant ............... H10N 60/80
2021/0365827 A1 11/2021 Monroe et al.

OTHER PUBLICATIONS

Albanese, Claudio, et al. "Mirror inversion of quantum states in linear registers." Physical review letters 93.23 (2004) (Year: 2004).*
Burgarth, Daniel. "Quantum state transfer and time-dependent disorder in quantum chains." The European Physical Journal Special Topics 151.1 (2007): pp. 147-155. (Year: 2007).*
Murphy, Michael, et al. "Communication at the quantum speed limit along a spin chain." Physical Review A—Atomic, Molecular, and Optical Physics 82.2 (2010). (Year: 2010).*
Boechat, Beatriz, et al. "Critical behavior of a quantum chain with four-spin interactions in the presence of longitudinal and transverse magnetic fields." Physical Review E 89.3 (2014) (Year: 2014).*
sciencedirect.com/topics/engineering/ising-model (Year: 2020).*
Raussendorf, R., "Quantum computation via translation-invariant operations on a chain of qubits", Physical Review A, 2005, p. 052301, vol. 72.
Bapat, A., et al., "Nearly optimal time-independent reversal of a spin chain", arXiv:2003.02843, Accessed: Jan. 25, 2022, DOI: https://groups.jqi.umd.edu/gorshkov/sites/groups.jqi.umd.edu.gorshkov/files/2003.02843.pdf.

* cited by examiner (A) INPUT STATE 203

(B) FINAL STATE 210

(A) INPUT STATE 203

(B) FINAL STATE xxx

US 12,530,606 B2

PERFORMING STATE REVERSAL ON A QUANTUM SPIN CHAIN

CROSS REFERENCE TO RELATED APPLICATIONS

This application claims the benefit of U.S. Provisional Patent Application Ser. No. 63/148,662 (filed Feb. 12, 2021), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a process for performing state reversal on a quantum spin chain, the process comprising: providing a plurality of qubits that are arranged in a quantum spin chain and in an input state, the quantum spin chain of qubits comprising an arbitrary number N of the qubits, such that the quantum spin chain comprises: a first terminal qubit disposed at a first terminus of the quantum spin chain; a second terminal qubit disposed at a second terminus of the quantum spin chain; and one or more intermediate qubits interposed between the first terminal qubit and the second terminal qubit along the quantum spin chain, such that: the qubits independently comprise a transverse field strength $h_k$; the first terminal qubit comprises a first longitudinal field strength $J_0$; the second terminal qubit comprises a second longitudinal field strength $J_N$; and for each nearest neighbor qubit pair, the nearest neighbor qubit pair independently comprises an Ising coupling strength $J_k$, wherein for the Ising coupling strength $J_k$, k is an integer from 1 to N−1, and N is the total number of qubits; and evolving the quantum spin chain from the input state to a final state for an evolution period $t_N$ to perform state reversal on the quantum spin chain.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
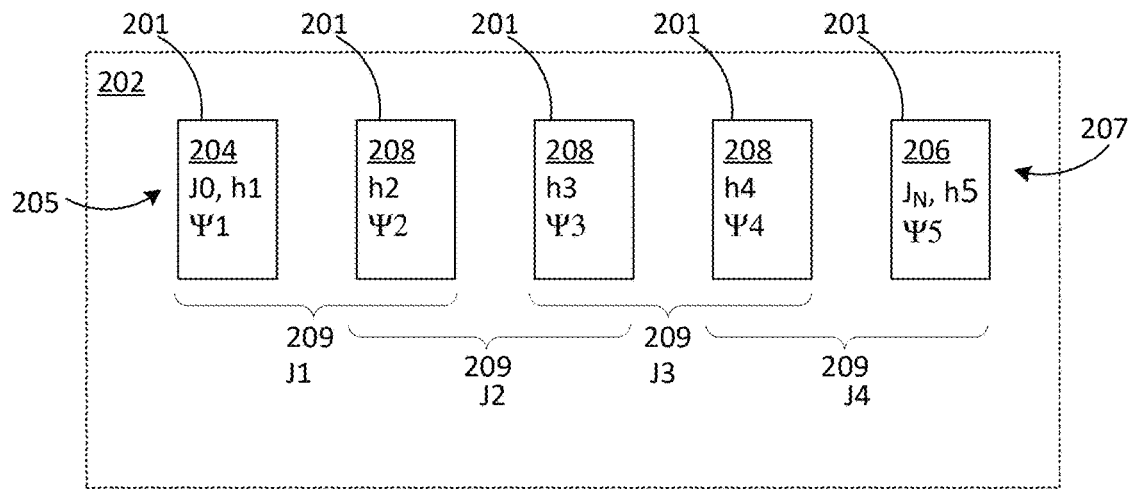
FIG. 1 shows: (A) an input state of a quantum spin chain for performing state reversal on the quantum spin chain and (B) a final state of the quantum spin chain after performing state reversal on a quantum spin chain on the input state, according to some embodiments.
Figure 1:
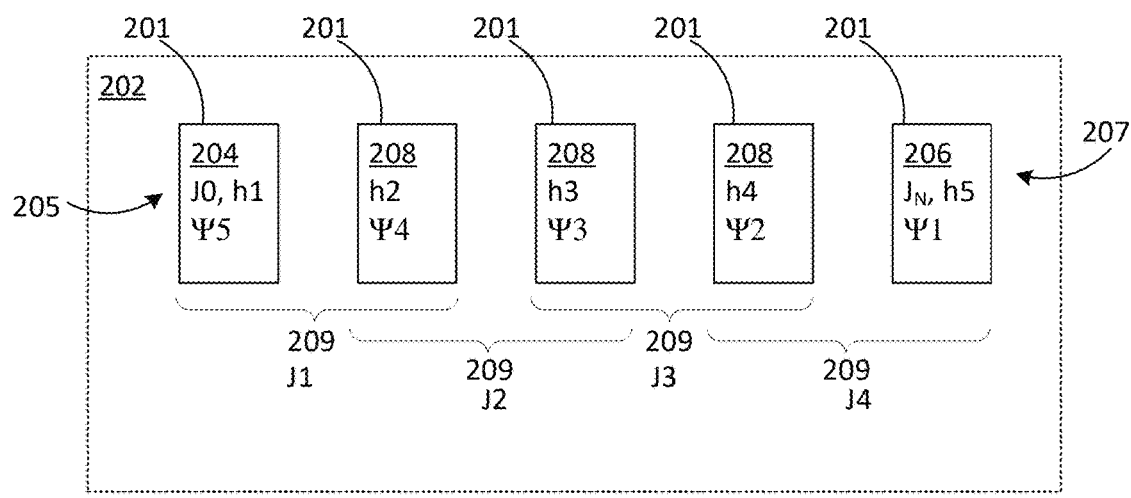

A detailed description of one or more embodiments is presented herein by way of exemplification and not limitation.

Quantum information transfer is a fundamental operation in quantum physics, and fast, accurate protocols for transferring quantum states across a physical system are likely to play a key role in the design of quantum computers and networks. For example, quantum information transfer can be used to establish long-range entanglement and is also useful for qubit routing in quantum architectures with limited connectivity. Conventional work studied implementation of various information transfer protocols, including Hamiltonian dynamics on spin chains, but these either do not implement the full state reversal or have deficiencies such as slow speed or need for dynamical control.

Information transfer in Hamiltonian systems is governed by the spread of entanglement and has close links to Lieb-Robinson bounds, entanglement area laws, and algorithms for quantum simulation. Fundamental limits to the rate of entanglement growth are set by bounds on the asymptotic entanglement capacity, and small incremental entangling theorems. It is described herein that these limits also can be used to obtain lower bounds on an execution time of Hamiltonian protocols for information transfer. This raises the issue of whether a protocol can achieve optimality by saturating the bound.

Quantum state transfer studies involve protocols for moving qubits through a spin chain. Some conventional technologies involve long-range interactions to speed up protocols. Embodiments described herein involve only nearest-neighbor interactions. Conventional state transfer protocols assume the intermediate medium to be in a known initial state or allow it to change in an unknown or non-trivial manner. Such protocols are not directly applicable when some or all spins in the chain contain data qubits that need to be transferred or maintained. Some protocols for state reversal, also known as state mirroring, take steps towards addressing this issue. State reversal reverses any input state on a spin chain about the center of the chain. Specifically, with qubit labeling 1, 2, ..., N, state reversal corresponds to the unitary $$R := \prod_{k=1}^{\lfloor \frac{N}{2} \rfloor} SWAP_{k,N+1-k} \quad (1)$$

up to a global phase, which is independent of the state. State reversal is potentially useful for the more general task of qubit routing to apply arbitrary permutations to the qubits. Conventional results in this area require the state to be in the single-excitation subspace or introduce phases in the final state that depend on a non-local property such as the number of qubits in state |1>. The protocol introduces a phase $(-1)^{M(M-1)/2}$ that is a function of the excitation number M (mod 4). This is non-trivial to correct e.g., in signaling the value of the left bit to the right end of a chain with zeros in the bulk. A right edge state prepared in |+> is flipped to |-> by the phase correction procedure, conditioned on the value of the left bit. By the signaling lower bound, one incurs a time overhead linear in N to correct these phases and implement a reversal for a general state.

The disclosed process for performing state reversal on a quantum spin chain described herein includes a time-independent protocol for state reversal using nearest-neighbor interactions. Advantageously, performing state reversal on a quantum spin chain can have application in noisy, connectivity-limited quantum devices. The disclosed process for performing state reversal on a quantum spin chain has an execution time that is nearly optimal, comparable to conventional time-dependent protocol. The disclosed process has reduced error scaling in system size to noise due to static disorder caused by imperfect fabrication when compared to a swap-based protocol. In addition, the disclosed process for performing state reversal on a quantum spin chain does not require dynamical control but only engineered nearest-neighbor couplings so the disclosed process can be more experimentally feasible than conventional reversal techniques on quantum systems such as superconducting qubits where dynamical control could be an additional source of noise.

Disclosed is a process for performing state reversal on a quantum spin chain using a time-independent Hamiltonian protocol. State reversal reverses qubit ordering in a chain of N spins. The disclosed process for performing state reversal on a quantum spin chain includes an easily implementable nearest-neighbor, transverse-field Ising reversal Hamiltonian H with time-independent, non-uniform couplings. Under selected normalization, the disclosed process provides state reversal that is three times faster than a naive approach using swap gates, in time comparable to the protocol presented in Raussendorf, Phys. Rev. A 72, 052301 (2005), the disclosure of which is incorporated by reference herein in its entirety, that requires dynamical control. Beneficially, the disclosed process for performing state reversal on a quantum spin chain takes time that is within a factor 1.502(1+1/N) of the shortest time possible. We prove lower bounds for performing state reversal on a quantum spin chain that hold for all nearest-neighbor qubit protocols with arbitrary finite ancilla spaces and local operations and classical communication. Advantageously, the disclosed process for performing state reversal on a quantum spin chain can be implemented with an infinite family of nearest-neighbor, time-independent Hamiltonians. This includes quantum spin chains with nearly uniform coupling.

Figure 2:
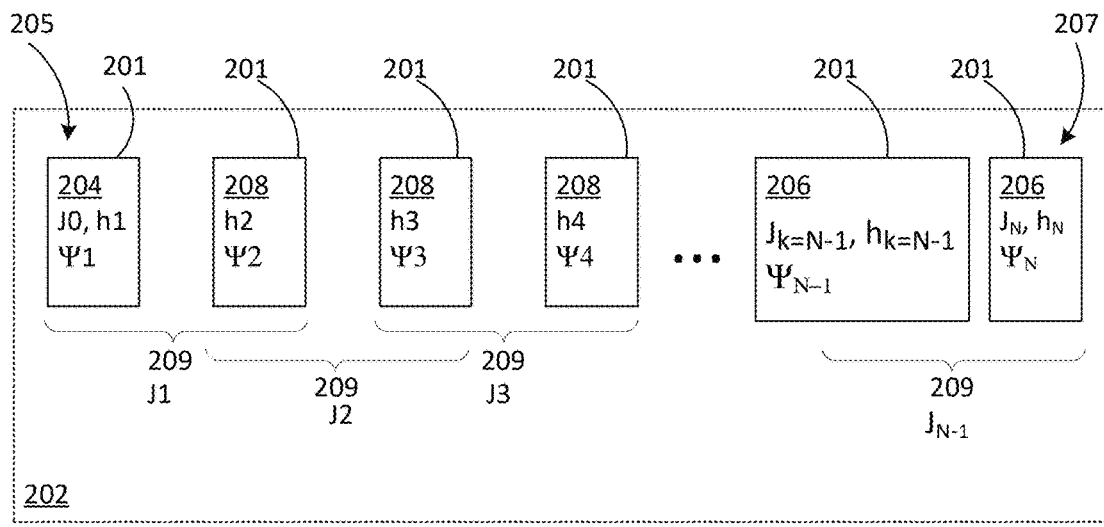
FIG. 2 shows: (A) an input state of a quantum spin chain for performing state reversal on the quantum spin chain and (B) a final state of the quantum spin chain after performing state reversal on a quantum spin chain on the input state, according to some embodiments.
Figure 2:
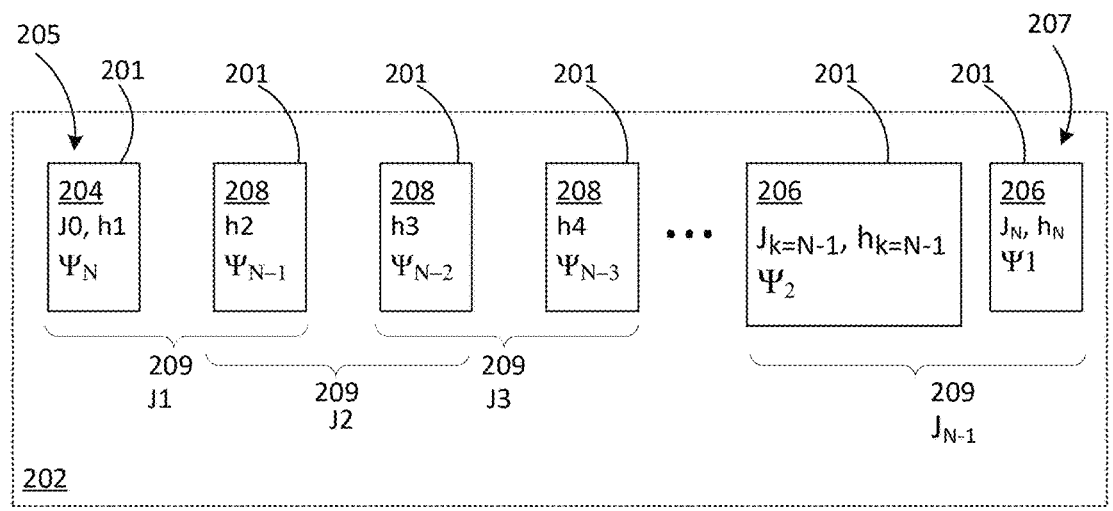
Figure 3:
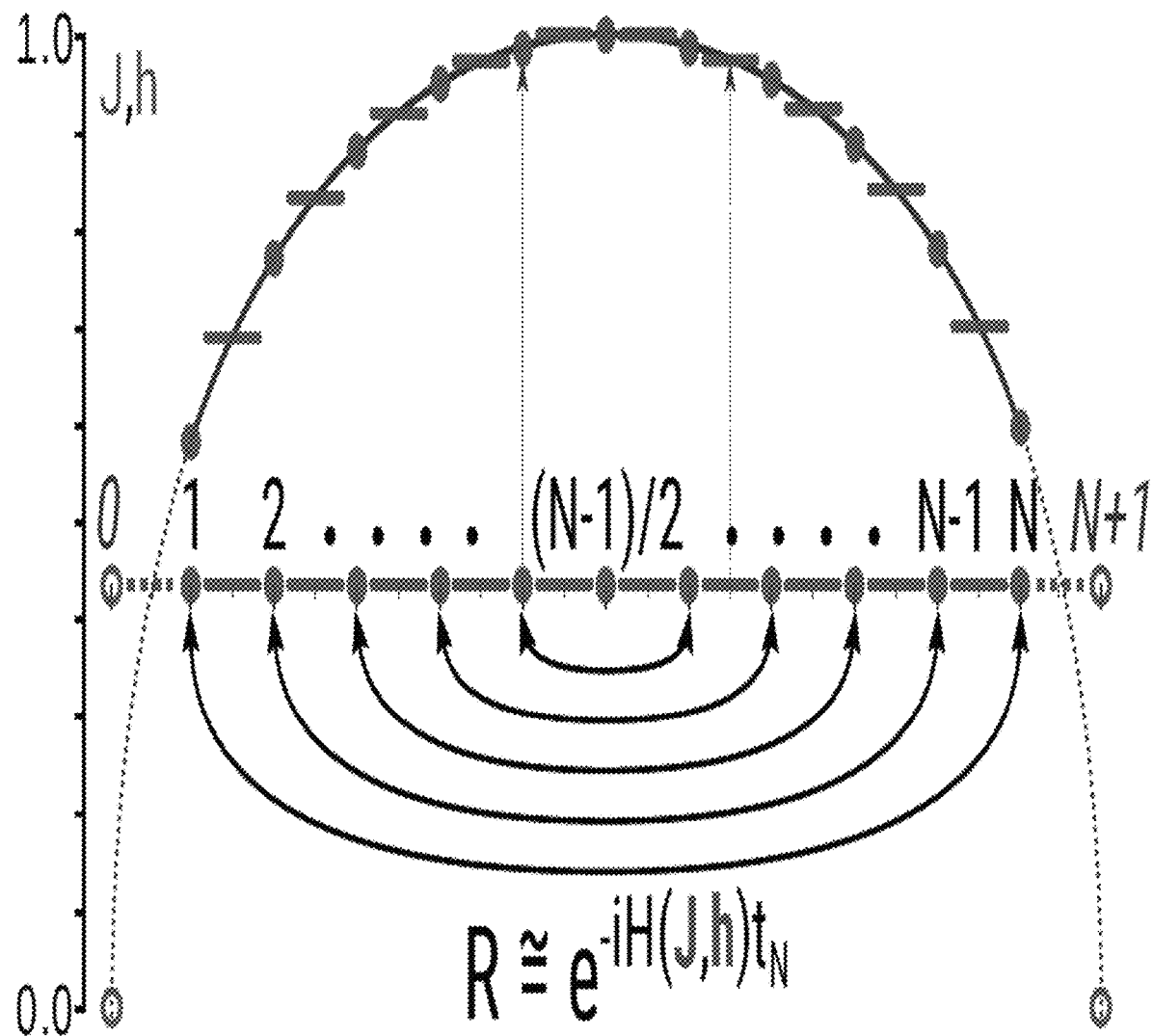
FIG. 3 shows state reversal operation R (depicted by arrows) via performing state reversal on a quantum spin chain as a time-independent protocol, wherein nearest-neighbor $\sigma_x^k \sigma_x^{k+1}$ couplings ($J_k$, red) and on-site $\sigma_z^k$ fields ($h_k$, blue) are plotted on the y-axis. Sites 0, N+1 are ancilla qubits that are not part of the protocol and are used for analysis, according to some embodiments.

In an embodiment, with reference to FIG. 1, FIG. 2, and FIG. 3, performing state reversal on a quantum spin chain includes: providing a plurality of qubits 201 that are arranged in a quantum spin chain 202 and in an input state 203, the quantum spin chain 202 of qubits 201 including an arbitrary number N of the qubits 201, such that the quantum spin chain 202 includes: a first terminal qubit 204 disposed at a first terminus 205 of the quantum spin chain 202; a second terminal qubit 206 disposed at a second terminus 207 of the quantum spin chain 202; and one or more intermediate qubits 208 interposed between the first terminal qubit 204 and the second terminal qubit 206 along the quantum spin chain 202, such that: the qubits 201 independently include a transverse field strength $h_k$; the first terminal qubit 204 includes a first longitudinal field strength $J_0$; the second terminal qubit 206 includes a second longitudinal field strength $J_N$; and for each nearest neighbor qubit pair 209, the nearest neighbor qubit pair 209 independently includes an Ising coupling strength $J_k$, wherein for the Ising coupling strength $J_k$, k is an integer from 1 to N−1, and N is the total number of qubits 201; and evolving the quantum spin chain 202 from the input state 203 to a final state 210 for an evolution period $t_N$ to perform state reversal on the quantum spin chain 202.

In an embodiment, performing state reversal on a quantum spin chain further includes subjecting the qubits 201 to a reversal Hamiltonian H. The reversal Hamiltonian H can include terms for the first longitudinal field strength $J_0$, the Ising coupling strength $J_k$, the second longitudinal field strength $J_N$, and the transverse field strength $h_k$.

In an embodiment, the reversal Hamiltonian H includes $$H(J, h) = J_0 \sigma_x^1 + \sum_{k=1}^{N-1} J_k \sigma_x^k \sigma_x^{k+1} + J_N \sigma_x^N - \sum_{k=1}^{N} h_k \sigma_z^k$$

that includes terms for the first longitudinal field strength $J_0$, the Ising coupling strength $J_k$, where k is an integer from 1 to N−1, the second longitudinal field strength $J_N$, and the transverse field strength $h_k$, where k is an integer from 1 to N. In the reversal Hamiltonian H, the Ising coupling strengths and longitudinal fields $J_k$ can be $J_k = a_{2k+1}$. The transverse field strength $h_k$ can be $h_k = a_{2k}$. In the reversal Hamiltonian H, $a_k$ can be provided as $$a_k = \pi \frac{\sqrt{(N+1)^2 - (N+1-k)^2}}{4 t_N}$$

where $t_N := \pi \sqrt{(N+1)^2 - p(N)}/4$ and $p(N) := N \pmod 2$.

In an embodiment, the Ising coupling strengths and longitudinal fields $J_k$ can be $$J_k^{(m)} = \frac{\pi}{4} \sqrt{(2k+1+4m)(2N+1-2k+4m)}.$$

Here, the transverse field strength $h_k$ can be $h_k^{(m)} = \pi \sqrt{k(N+1-k)}.$ Each qubit 201 can include quantum information stored in single-qubit quantum state ψ. In an embodiment, in the input state 203, the order of the single-qubit quantum states ψ in the qubits 201 along the quantum spin chain 202 is $\psi_1, \ldots, \psi_N$. In the final state 210, the order of the single-qubit quantum states $\psi$ in the qubits 201 is reversed along the quantum spin chain 202 from the input state 203 and is $\psi_N, \ldots, \psi_1$ as a result of performing state reversal on a quantum spin chain.

Exemplary qubits 201 include a superconducting qubit, a Rydberg atom, a photon, an ion, an electron, a vacancy in a crystalline structure, and the like. The number N of qubits 201 in quantum spin chain 202 is arbitrary for the disclosed process for performing state reversal on a quantum spin chain. It should be appreciated that, regardless of the number of qubits 201, state reversal reverses the input state 203 on the quantum spin chain 202 about a central intermediate qubit 208 of the quantum spin chain 202 during evolution period $t_N$. For example, as shown in FIG. 1 for five qubits, state reversal of single-qubit states among qubits 201 occurs about the central qubit storing quantum information in single-qubit state $\psi_3$. State reversal for an arbitrary number of qubits is shown in FIG. 2 and FIG. 3.

It is contemplated that the quantum spin chain 202 can be engineered via processes known in the art, including creation of qubits on a wafer, e.g, that can include a semiconductor, insulator, wiring to the qubits if applicable, and the like. Trapped atoms can be configured into a chain that can be prepared into the input state 203 and subjected to the disclosed process for performing state reversal using Rydberg-Rydberg interactions to engineer Ising coupling. The final state 210 maintains the set of initial single-qubit quantum states $\psi$ but in a reverse order along the quantum spin chain 202. Performing state reversal on a quantum spin chain can be implemented in quantum spin chains and systems described, e.g., in U.S. Pat. Nos. 9,270,385, 8,816,325, 11,108,398, and 9,146,441 and U.S. patent application Ser. No. 17/384,574, the disclosure of each of which is incorporated by reference herein in its entirety.

Advantageously, the disclosed process for performing state reversal on a quantum spin chain consists essentially of nearest-neighbor interactions among qubits 201 in the absence of long-range interactions among qubits 201. Moreover, the disclosed process for performing state reversal on a quantum spin chain uses a time-independent Hamiltonian. The execution time of the disclosed process for performing state reversal on a quantum spin chain is substantially optimal. That is, the execution time of the disclosed process for performing state reversal on a quantum spin chain is within $1.502(1+1/N)$ of the shortest possible.

For any nearest-neighbor spin Hamiltonian H, a time scale follows from a normalization that limits the strength of every two-qubit interaction but allows fast local operations. Up to local unitaries, any two-qubit Hamiltonian in the canonical form is $$K := \sum_{j \in \{x,y,z\}} K_{\mu j} \sigma_j \otimes \sigma_j, \qquad (2)$$

where $\mu_x \geq \mu_y \geq |\mu_z| \geq 0$ and $\sigma_j$ are the Pauli matrices. The normalization condition is $\|K\| = \sum_j |\mu_j| \leq 1$ for all interactions, where $\|\cdot\|$ is the spectral norm. Under this normalization, a swap can be optimally implemented in time $3\pi/4$, and the disclosed process for performing state reversal on a quantum spin chain achieves state reversal in time $$t_N := \pi \sqrt{(N+1)^2 - p(N)}/4, \qquad (3)$$

where $p(N) := N \pmod 2$. This is equivalent in time to a swap gate circuit of depth $\sim N/3$. As state reversal using only swaps requires depth at least $N-1$, the disclosed process for performing state reversal on a quantum spin chain is faster than conventional swap-based protocols by an asymptotic factor of 3. Certain conventional time-independent Hamiltonian protocols that use nearest-neighbor interactions implement state transfer in time $N\pi/4$ or $N\pi/2$ but introduce relative phases in the state. Accordingly, the disclosed process for performing state reversal on a quantum spin chain is faster than these conventional methods for state transfer and state reversal except for a subleading term.

It is contemplated that one can lower-bound the time for state reversal, which can generate entanglement across a bipartition, by using bounds on the asymptotic entanglement capacity in a more general model. The asymptotic entanglement capacity bounds the rate at which entanglement can be generated by any evolution of a given bipartite Hamiltonian interspersed with arbitrary local operations and classical communication (LOCC) and with arbitrary finite local ancilla spaces. Herein is provided an example of entanglement generated by state reversal and the time is lower-bounded using the capacity of a normalized two-qubit interaction in canonical form (2), even allowing for LOCC. Nonetheless, the disclosed process for performing state reversal on a quantum spin chain nearly saturates this bound without classical communication, without ancillas, and with only nearest-neighbor interactions throughout quantum spin chain 202.

In the disclosed process for performing state reversal on a quantum spin chain, state reversal is accomplished with a Hamiltonian of the form $$H(J, h) = J_0 \sigma_x^1 + \sum_{k=1}^{N-1} J_k \sigma_x^k \sigma_x^{k+1} + J_N \sigma_x^N - \sum_k^N \sigma_Z^k \qquad (4)$$

where the coefficients J,h are engineered as follows. Letting $$a_k := \pi \sqrt{(N+1)^2 - (N+1-k)^2}/(4tN), \qquad (5)$$

for $k \in \mathbb{N}$, in an embodiment, the disclosed process for performing state reversal on a quantum spin chain is Protocol 1 (see also FIG. 3). For Protocol 1, let $J_k = a_{2k+1}$, $h_k = a_{2k}$ for all sites k, and let $H := H(J,h)$, and apply $U := e^{-it_N H}$ to the input state.

Accordingly, the disclosed process for performing state reversal on a quantum spin chain implements state reversal exactly, up to a global phase, which is indicated as an equivalence by $\cong$. In other words, Theorem 2 applies, wherein $U \cong R$. Theorem 2.

Some conventional time-dependent protocols allow the state to evolve alternately under two restrictions of the Hamiltonian (4): H(1,0) (uniform Ising) and H(0,1) (uniform transverse field), each for time $\pi/4$, for a total of N+1 rounds. In the Majorana picture described below, these Hamiltonians carry out a simultaneous braiding of neighboring Majoranas along even (resp. odd) edges of the doubled Majorana chain. The resulting map matches exactly Lemma 3 described below, implying that the disclosed process for performing state reversal on a quantum spin chain and such conventional time-dependent protocols are identical at the level of Majorana operators. Any protocol achieving the map in Lemma 3 is guaranteed to implement state reversal.

In an embodiment, as further described in Example 1, there is an infinite family of nearest-neighbor, time-independent Hamiltonian protocols for state reversal that generalizes Protocol 1. This family is parameterized by a non-negative integer m, with modified $\sigma_x^k \sigma_x^{k+1}$ coupling $J_k^{(m)} \propto \sqrt{(2N+1-2k+4m)(2k+1+4m)}$ and unmodified $\sigma_z^k$ field strength. Protocol 1 corresponds to the special case of m=0. By choosing large m, the coupling strength can be engineered to be nearly uniform throughout the chain, which may be a feature in implementations of the disclosed process for performing state reversal on a quantum spin chain.

The disclosed process for performing state reversal on a quantum spin chain is more robust to noise than conventional techniques. Static disorder could be caused by imperfect fabrication of a quantum spin chain or tuning in NISQ implementations. With strong disorder and an error threshold, e.g., of 0.03, a swap protocol can only reverse 4 sites, whereas the disclosed process for performing state reversal on a quantum spin chain can reverse 8 sites.

In general, one would like to know how fast one can perform qubit routing on graphs. Qubit routing is a key subroutine in quantum architectures with incomplete connectivity and can improve runtimes of general quantum algorithms by overcoming limitations imposed by the underlying qubit connectivity. Indeed, a constant-factor speedup over a swap-based approach is achievable for general qubit routing on the chain using the disclosed process for performing state reversal on a quantum spin chain as a primitive.

The articles and processes herein are illustrated further by the following Examples, which are non-limiting.

Example 1

Infinite Family of Hamiltonians for State Reversal.

There is an infinite family of XY Hamiltonians that can generalize certain protocols. Protocol 1 for performing state reversal on a quantum spin chain is a case of an infinite family of protocols for performing state reversal on a quantum spin chain that is parameterized by a single non-negative integer m.

According to Protocol S3 for performing state reversal on a quantum spin chain, let $m \in \mathbb{Z}_{\geq 0}$, and $$J_k^{(m)} := \frac{\pi}{4}\sqrt{(2k+1+4m)(2N+1-2k+4m)} \quad (6)$$

$$h_k^{(m)} := \pi\sqrt{k(N+1-k)} \quad (7)$$

for all sites k=1, . . . , N. Let $H^{(m)}=H(J^{(m)},h^{(m)})$. Apply $U^{(m)}:=e^{-iH^{(m)}}$ to the input state.

Protocol S3 modifies only the couplings $J_k^{(m)}$ as a function of m, while the field terms $h_k^{(m)}=h_k$ are invariant with m. $U^{(0)}=U$, so Protocol 1 is a case of Protocol S3. For convenience, coefficients are rescaled so that the evolution time is 1. To prove the correctness of this family of protocols, write the Hamiltonian $H^{(m)}$ in terms of Majorana fermions obtained by Jordan-Wigner transformation on the spin chain (extended to edge sites {0, N+1}) to obtain $$H^{(m)} = \frac{1}{2}\gamma \cdot A^{(m)} \cdot \gamma, \quad (8)$$

where $\gamma = [\gamma_1 \; \gamma_2 \; \cdots \; \gamma_{2N+2}]$ and $A^{(m)}$ is a (2N+2)×(2N+2) tridiagonal matrix with entries $$A^{(m)} = i\begin{pmatrix} 0 & J_0^{(m)} & & & & \\ -J_0^{(m)} & 0 & h_1 & & & \\ & -h_1 & 0 & J_1^{(m)} & & \\ & & \ddots & \ddots & \ddots & \\ & & & -h_N & 0 & J_N^{(m)} \\ & & & & -J_N^{(m)} & 0 \end{pmatrix}. \quad (9)$$

The Heisenberg evolution of the Majoranas under $H^{(m)}$ is given by $\gamma(t)=e^{2iA(m)t}\gamma(0)$. Lemma 3 given below shows that the operator $e^{2iA(0)}$ implements reversal. Here we show that $e^{2iA(m)}=e^{2iA(0)}$ for all m, which implies that $U^{(m)}$ implements state reversal for all m. Lemma S4 is provided on the spectrum of $A^{(m)}$.

Lemma S4. Let $A^{(m)}$ be as given in (9), and $s_k := \mathrm{sgn}(2N+3-2k)$. Then $A^{(m)}$ has spectrum $$E_k^{(m)} = \frac{\pi}{4}(2k - 2N - 3 + 4s_k m) \quad (10)$$

for k=1, . . . , 2N+2. The corresponding eigenvectors $v_k$ satisfy $v_{kj}=(-1)^{N+k-j+1/2}v_{k(2N+3-j)}$.

Proof. Via a transformation of the off-diagonals that preserves the spectrum, $A^{(m)}$ can be converted to a matrix B(n, a) of Sylvester-Kac type $$B(n, a) := \frac{\pi}{4}\begin{pmatrix} 0 & 1+a & & & & \\ n+a & 0 & 2 & & & \\ & n-1 & 0 & 3+a & & \\ & & \ddots & \ddots & \ddots & \\ & & & 2 & 0 & n+a \\ & & & & 1+a & 0 \end{pmatrix}, \quad (11)$$

for n=2N+1, a=4m. The eigenvalues of B(n, a) are given by the formula $$\lambda_{\pm,j} = \pm\frac{\pi}{4}\left|2j + 1 + a\right|$$

for j∈ {0, . . . , n}, and the first claim follows.

For the second claim, $A^{(m)}$ may be converted to a real, symmetric, tridiagonal matrix $C^{(m)}$ with positive off-diagonal entries via the similarity transformation $C^{(m)}:=DA^{(m)}D^{-1}$ where $D=\mathrm{diag}(i, i^2, \ldots i^{2N+2})$. The eigenvectors $u_k=Dv_k$ of $C^{(m)}$ (ordered by ascending eigenvalue) satisfy $u_{kj}=(-1)^{k-1}u_{k(2N+3-j)}$ for k=1, . . . 2N+2. Correspondingly, the eigenvalues of $A^{(m)}$ satisfy $v_{kj}=(-1)^{k-1}i^{2N+3-2j}v_{k(2N+3-j)}=(-1)^{N+k-j+1/2}v_{k(2N+3-j)}$.

Finally, $e^{2iA(m)}$ implements reversal.

Theorem S5. For all $m \in \mathbb{Z}_{\geq 0}$, A(m) satisfies $[e^{2iA(m)}]_{jl}=(-1)^{j-1}\delta_{j(2N+3-l)}$.

Proof. Here, $$e^{2iA(m)} = \sum_{k=1}^{2N+2} e^{2iE_k^{(m)}} v_k v_k^\dagger = \sum_{k=1}^{2N+2}(-1)^{k-N-3/2}v_k v_k^\dagger, \quad (12)$$

where the trivial phase $2\pi i m s_k$ is dropped. The matrix elements of $e^{iA(m)}$ are $$\left[e^{iA^{(m)}}\right]_{jl} = \sum_{k=1}^{2N+2} (-1)^{k-N-3/2} v_{kj} v_{kl}^* \qquad (13)$$

$$= \sum_{k=1}^{2N+2} (-1)^{2N+2-l} v_{kj} v_{k(2N+3-l)}^* \qquad (14)$$

$$= (-1)^{j-1} \delta_{j(2N+3-l)}, \qquad (15)$$

where in the second step, Lemma S4 is used as $$v_{kl}^* = (-1)^{l-k-N-1/2} v_{k(2N+3-l)}^*.$$

Therefore, $e^{2iA^{(m)}}$ maps $\gamma_k \to (-1)^{k-1} \gamma_{2N+3-k}$, which implies that the protocol $U^{(m)}$ implements state reversal for all $m \in \mathbb{Z}_{\geq 0}$.

When normalized so that all two-qubit terms are bounded by unity in spectral norm, $H^{(m)}$ implements state reversal in time $$t_N^{(m)} = \frac{(N+1+4m)\pi}{4}.$$

Therefore, the time cost increases linearly in m and is minimal for Protocol 1 where m=0.

If 4m>>N, the variation in coupling coefficients $J_k^{(m)}$ is small and on the order $$\sim \frac{1}{8}\left(\frac{N+1}{2m}\right)^2.$$

Therefore, the parameter m quantifies a trade-off between reversal time and the non-uniformity of $J_k^{(m)}$. Setting m=N+1, for example, yields a variation in the couplings on the order of 3% for any N, and gives reversal in time 5Nπ/4.

Example 2

Robustness of Performing State Reversal on a Quantum Spin Chain.

Protocol 1 and its generalizations are exact, i.e., any input state |ψ⟩ maps perfectly to the output R|ψ⟩ when interaction coefficients are implemented as prescribed. However, inherent in physical systems is noise, and the usefulness of a given state transfer protocol is determined not only by the time of operation and fidelity under perfect implementation but also resilience to noise. Here, imperfect fabrication is modelled as a static noise term on every coefficient in the Hamiltonian. We compare our time-independent protocol with a swap-based protocol for reversal (odd-even sort) and a gate-based protocol.

Stochastic noise can be modeled as a perturbation to the Hamiltonian coefficients. For the case of disorder, we draw a single noise term for every coefficient from the normal distribution N. We assume that the noise is multiplicative so that the noise strength scales proportional to the magnitude of the coefficient. The perturbed Hamiltonian H' for our time-independent protocol is $$H' = J_0' \sigma_x^1 + \sum_{k=1}^{N-1} J_k' \sigma_x^k \sigma_x^{k+1} + J_N' \sigma_x^N - \sum_{k=1}^{N} h_k' \sigma_x^k, \qquad (16)$$

where $J_i' = J_i \cdot (1+\delta J_i)$, $h_i' = h_i \cdot (1+\delta h_i)$, where $\delta h_i \sim N(\delta_h)$, $\delta J_i \sim N(\delta_J)$ for specified standard deviations $\delta_h$, $\delta_J \geq 0$. Evolution under this Hamiltonian gives a noisy reversal $R' := e^{-iH't}_N$ that reduces to R when $\delta_h = \delta_J = 0$. For swap and gate-based protocols, we compute an equivalent Hamiltonian formulation and similarly add noise terms.

A metric for the distinguishability of outputs of two quantum channels is the completely bounded trace norm, also referred to as the diamond norm. The computation of the diamond norm can be efficiently expressed as the solution to a semidefinite program, making it a somewhat non-trivial quantity to compute. We consider unitary noise models, where the diamond distance is equivalent to a simpler notion of distinguishability, the spectral distance $$\Delta := \|R' - R\|, \qquad (17)$$

where we take the spectral norm of the difference between perfect and noisy state reversals R and R'. In this case, the diamond distance is at most two times as large as the spectral distance. The distance Δ can be used to bound another common figure of merit, the fidelity $$F(\rho,\sigma) = Tr(\sqrt{\sqrt{\rho}\sigma\sqrt{\rho}}), \qquad (18)$$

for output states ρ and σ evolved by a perfect and noisy reversal, respectively.

To prove a bound on the minimum fidelity for completeness, bound Δ by the minimum fidelity over pure states as follows:

$$\Delta^2 = \left\|(R-R')^\dagger (R-R')\right\| \qquad (19)$$

$$= \max_{|\psi\rangle} |\langle \psi|(R-R')^\dagger(R-R')|\psi\rangle| \qquad (20)$$

$$= \max_{|\psi\rangle} |\langle \psi|2\mathbb{I} - R^\dagger R' - R'^\dagger R|\psi\rangle| \qquad (21)$$

$$= \max_{|\psi\rangle} |2 - 2\operatorname{Re}\langle \psi|R^\dagger R'|\psi\rangle| \qquad (22)$$

$$= 2 - \min_{|\psi\rangle} 2\operatorname{Re}\langle \psi|R^\dagger R'|\psi\rangle \qquad (23)$$

$$\geq 2 - 2\min_{|\psi\rangle} |\langle \psi|R^\dagger R'|\psi\rangle|, \qquad (24)$$

for any unitary U, Re⟨ψ|U|ψ⟩≤1, and Re[z]≤|z| for any z∈ℂ. Let $F_{min}$ denote the worst-case fidelity over all input states. By the joint concavity of the fidelity, $F_{min}$ is attained for a pure state, thus $$F_{min} = \min_{|\psi\rangle} F(R'|\psi\rangle, R|\psi\rangle) = |\langle R^\dagger R'|\psi\rangle| \qquad (25)$$

since $F(|\phi_1\rangle, |\phi_2\rangle) = |\langle \phi_2|\phi_1\rangle|$ for pure states $|\phi_1\rangle$ and $|\phi_2\rangle$. It follows from (24) that $F_{min} \geq 1 - \frac{1}{2}\Delta^2$.

Figure 4:
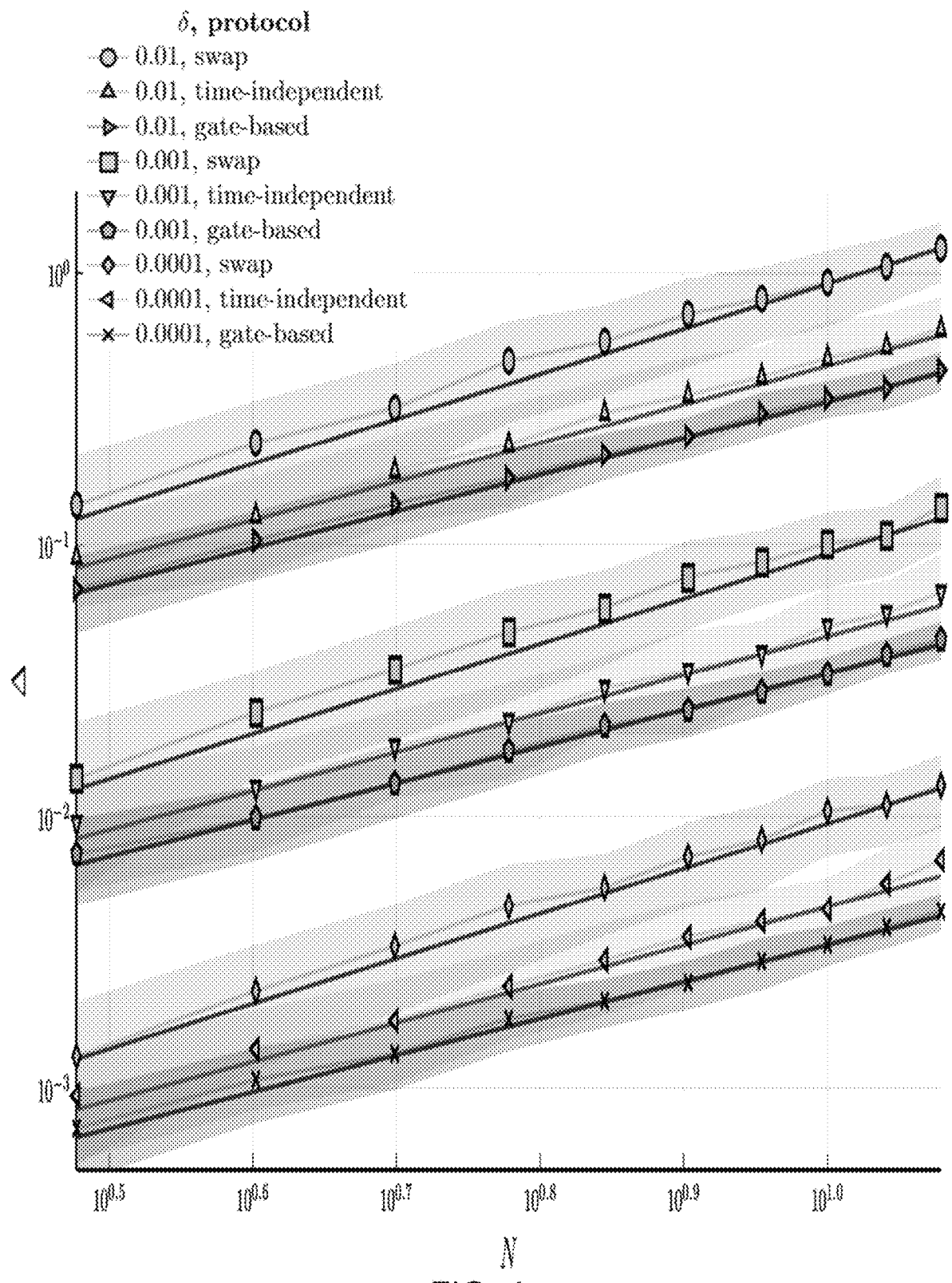
FIG. 4 shows, according to the Example 2, spectral distance mean values with standard deviation (shaded region) for different protocols under varying strengths of noise. We take 100 samples for each data point and use a linear fit for a power law $\Delta = \exp(N^a \delta^b)$ controlled on the protocol, i.e., fitting log $\Delta$=a log N+b log $\delta$+O(1), to find (standard error) a≈1.66(0.012) and b≈0.994(0.0028) for the swap-based protocol. The b coefficient changes insignificantly for time-independent and gate-based protocols, but the a coefficient is reduced by 0.31(0.016) for gate-based and 0.23(0.016) for time-independent protocols, indicating more robust scaling of these protocols in system size, relative to a swap-based protocol.

We estimate the spectral distance dependence on noise and system size in the three candidate protocols. For each protocol, we probe the distance as a function of similar on-site and coupling disorder $\delta = \delta_h = \delta_J$, and increasing number of spins N. The spectral distance is computed by exact diagonalization, taking time exponential in N, and it is possible to probe system sizes up to N=14 with the resources available. At these sizes, we can already see differences between the protocols, shown in FIG. 4.

At each error rate $\delta$, the swap protocol has the worst performance, the time-independent protocol performs better, and the gate-based protocol has the best performance. We note that the gate-based and time-independent protocols perform within a standard deviation of one another, but the swap protocol is significantly noisier. For example, at a threshold of $\Delta \leq 0.03$, the swap can reverse only up to 4 sites, while the time-independent protocol can successfully reverse 8 sites. Therefore, the specialized protocols for reversal improve upon swap-based protocols not only in runtime but also in accuracy.

The relative performance of time-independent and gate-based protocols (including the swap protocol) may not be captured by our simulations. Since the time-independent protocol is static, it derives its error primarily from imperfect engineering of the coupling strengths and interactions with the environment. Gate-based protocols require dynamical control, which could be an additional source of noise.

Example 3

With regard to a proof and analysis of the protocol for performing state reversal on a quantum spin chain, we prove correctness of Theorem 2 by mapping the spin chain to a doubled chain of Majorana fermions via a Jordan-Wigner transformation, describing the action in the Majorana picture, and then mapping back to the spin picture. To help with the analysis, we extend the chain with two ancillary sites $\{0, N+1\}$ called the edge, E, and refer to the sites $\{1, \ldots, N\}$ as the bulk, B. We define the transverse field Ising model (TFIM) Hamiltonian $$\tilde{H} := \Sigma_{k=0}^{N} a_{2k+1} \sigma_x^k \sigma_x^{k+1} - \Sigma_{k=1}^{N} a_{2k} \sigma_z^k \qquad (26)$$

on the extended chain that reduces to H when the edge is initialized to state $|++\rangle$. Similarly, we define $\tilde{U} := e^{-i t_N \tilde{H}}$. Note that the operator $\tilde{H}$ (and hence $\tilde{U}$) acts trivially on $|++\rangle_E$, so this edge state does not change through the course of the evolution. The result also holds using the edge state $|--\rangle_E$, which is equivalent to negating the sign of the longitudinal fields in (4).

In the Heisenberg picture, Pauli matrices on site k map to the corresponding Pauli on site $N+1-k$ for all sites k in the chain. First, we map to the doubled chain of Majorana fermionic operators by defining $$\gamma_{2k} := P_{[0,k-1]} \cdot \sigma_x^k, \gamma_{2k+1} := P_{[0,k-1]} \cdot \sigma_y^k \qquad (27)$$

at each site, where we have used the notation $P_{[a,b]} := \Pi_{j=a}^{b} (-\sigma_2^j)$ for the Jordan-Wigner parity string between sites a and b. The $\gamma_k$ are Hermitian and satisfy the Majorana anti-commutation relations $\{\gamma_j, \gamma_k\} = 2\delta_{jk}$. We also see that $\sigma_z^k = -i\gamma_{2k}\gamma_{2k+1}$ and $\sigma_z^k \sigma_x^{k+1} = i\gamma_{2k+1}\gamma_{2k+2}$, leading (6) to take the form $$\tilde{H} = i \Sigma_{k=1}^{2N+1} a_k \gamma_k \gamma_{k+1}. \qquad (28)$$

The Majoranas $\gamma_0$, $\gamma_{2N+3}$ do not appear in the sum, since $a_0 = a_{2N+2} = 0$. In the following lemma, we show how $\tilde{U}$ transforms the Majorana operators. Our main technique is an analogy with the dynamics of the y component of the spin operator for a spin $N+\frac{1}{2}$ particle. Here, the same analogy provides a protocol which gives state reversal on all spins in the chain without introducing relative phases.

Lemma 3. The operation $\tilde{U}$ acts on the Majorana operators as $$\tilde{U} \gamma_k \tilde{U}^\dagger = \begin{cases} \gamma_k & \text{if } k = 0, 2N+3, \\ (-1)^{k-1} \gamma_{2n+3-k} & \text{otherwise.} \end{cases} \qquad (29)$$

Proof. For the first case, $\tilde{H}$ has no overlap with operators $\gamma_0$ and $\gamma_{2N+3}$, so they are stationary under evolution by $\tilde{H}$.

For the remaining cases, we use the analogy with a spin $s = N+\frac{1}{2}$ particle. The Heisenberg evolution of $\gamma_k$ corresponds to the rotation of the $S_z$ eigenstate $|s, k-s-1\rangle$ of magnetization $k-s-1$. Observing that $$\frac{i\pi}{4 t_N} \langle s, m | S_y | s, m' \rangle = a_{s+m+1} \left( \delta_{m'(m+1)} - \delta_{m(m'+1)} \right) \qquad (30)$$

(with $\hbar = 1$), we can express (28) in the bilinear form $\tilde{H} = \frac{1}{2} \gamma^\dagger A \gamma$, for the vector $\gamma := [\gamma_1 \gamma_2 \ldots \gamma_{2N+2}]$ and the matrix $A := -\pi/(2 t_N) S_y$ expressed in the $S_z$ basis. Using the Majorana commutation relations, we have $\dot{\gamma} = i[\tilde{H}, \gamma] = 2iA\gamma$, so $\gamma(t) = e^{2iAt} \gamma(0)$. The Heisenberg evolution of $\gamma_k$ under $\tilde{H}$ for time $t_N$ is exactly analogous to the Schrodinger time evolution of the state $|s, k-s-1\rangle$ under $S_y$ for time $\pi$. A $\pi$-rotation under $S_y$ maps $$|s, -s+k-1\rangle \mapsto (-1)^{k-1} |s, s-k+1\rangle, \qquad (31)$$

and correspondingly, $\gamma_k(t_N) = (-1)^{k-1} \gamma_{2N+3-k}$.

Note that (31) can easily be verified for a spin-$\frac{1}{2}$ particle. Similarly, a spin-s particle may be viewed as a system of 2s spin-$\frac{1}{2}$ particles with maximal total spin. In this picture, a $\pi$-rotation under $S_y$ corresponds to independent $\pi$-rotations of each small spin. Since the state $|s, k-s-1\rangle$ is represented by a permutation-symmetric state with k-1 up spins, the $\pi$-rotation maps it to a state with $2s-(k-1)$ up spins and introduces a phase $(-1)$ for each up spin, which is (31).

Due to the signed reversal of the Majoranas in Lemma 3, the parity string $P_{[0, k]} = i^{b+1-a} \Pi_{j=2a}^{2b+1} \gamma_j$ is (with the exception of $\gamma_0$) reflected about the center of the chain with an overall phase that exactly cancels when the product is reordered by increasing site index. The invariance of the edge Majoranas provides a phase factor that cancels the state-dependent phases when we revert to the spin picture. In particular, we have the following lemma.

Lemma 4. The operation $\tilde{U}$ acts on the parity strings as $\tilde{U} P_{[0, k]} \tilde{U}^\dagger = i \sigma_x^0 \sigma_x^{N+1} P_{[0,N-k]}$ for all k.

Proof. Applying Lemma 3, we have $$\tilde{U} P_{[0,k]} \tilde{U}^\dagger = i^{k+1}(-1)^{2k+1} \gamma_0 \prod_{j=1}^{2k+1} \gamma_{2N+3-j} \qquad (32)$$

$$= \gamma_0 P_{[0,N]} P_{[0,N-k]} \gamma_{2N+2} \qquad (33)$$

where we reordered the product and used $P_{[N+1-k,N]} = P_{[0,N]} P_{[0,N-k]}$. From the Majorana anti-commutation relations and (27), the result follows.

Proof of Theorem 2. $U \cong R$ holds iff all bulk observables on the chain transform identically under U, R. For any operator $O^k$ supported on bulk site $k \in \{1, \ldots, N\}$, we show that $U O^k U^\dagger = \langle ++| U_e O^k U_e^\dagger |++\rangle_E = O^{N+1-k}$. Henceforth, drop the edge subscript E. By (27) and Lemmas 3 and 4, $\sigma_x^k$ is mapped to $$U\sigma_x^k U^\dagger = \langle ++ | \tilde{U} P_{[0,k-1]} \tilde{U}^\dagger | ++ \rangle \quad (34)$$

$$= -i < ++ | \sigma_x^0 \sigma_x^{N+1} P_{[0,N+1-k]} \gamma_{2N+3-2k} | ++ > \quad (35)$$

$$= -i\sigma_z^{N+1-k} \sigma_y^{N+1-k} = \sigma_x^{N+1-k}. \quad (36)$$

Use Lemma 4 to show that $\sigma_z^k$ is mapped to $$U\sigma_z^k U^\dagger = -\langle ++ | \tilde{U} P_{[0,k-1]} \tilde{U}^\dagger | ++ \rangle \quad (37)$$

$$= \langle ++ | \sigma_x^0 \sigma_x^{N+1} P_{[0,N+1-k]} \sigma_x^0 \sigma_x^{N+1} P_{[0,N-k]} | ++ \rangle \quad (38)$$

$$= \sigma_z^{N+1-k}. \quad (39)$$

All other observables can be written in terms of the onsite Pauli operators $\sigma_x^k$, $\sigma_z^k$, so U is identical to R, up to global phase.

Time lower bound follows.

We now prove a lower bound on the optimal time, t*, to implement state reversal using normalized local interactions. Let the entanglement entropy between systems A and B of a bipartite state $|\psi\rangle_{AB}$ be $E(|\psi\rangle)$, defined as the local von Neumann entropy $S(\rho) := -\text{Tr}(\rho \log_2 \rho)$, for $\rho = \text{Tr}_B(|\psi\rangle\langle\psi|)$. Then, the asymptotic entanglement capacity of a Hamiltonian H that couples systems A and B is $$E_H = \sup_{|\psi\rangle \in \mathcal{H}_{AA'BB'}} \lim_{t \to 0} \frac{E(e^{-iHt}|\psi\rangle) - E(|\psi\rangle)}{t}, \quad (40)$$

where $H_{AA'BB'}$ is the Hilbert space of the bipartite systems A and B with arbitrarily large ancilla spaces A' and B', respectively. In particular, for a Hamiltonian of the form $\sigma_x \otimes \sigma_x$, $$\alpha := E_{\sigma_x \otimes \sigma_x} = 2\max_y \sqrt{y(1-y)} \log \frac{y}{1-y} \approx 1.912. \quad (41)$$

This is tighter than the more general small incremental entangling bound $E_H \leq c\|H\|\log_2 d=2$ for the conjectured c=2 [13] (best known c=4) and where the smallest dimension of A or B gives d=2. Since E is invariant under local unitaries, a direct corollary is that $$E\sigma_y \otimes \sigma_y = E\sigma_z \otimes \sigma_z = \alpha.$$

Protocol 1 is close to the shortest time possible.
Theorem 5. It holds that $$\frac{t_N}{t^*(1+1/N)} \leq \alpha\pi/4 < 1.502.$$

Proof. We prove the time lower bound via an upper bound on the rate of increase of entanglement across a cut in the center of the chain (allowing differences of one qubit for odd N). Designate the left half of the cut as subsystem A and the right half as subsystem B. A consists of subsystem A given by the qubit at site $\lfloor N/2 \rfloor$ adjacent to the cut, and subsystem A' consisting of the remaining qubits to the left of the cut as well as a finite but arbitrary number of ancilla systems that are not part of the chain. Similarly, B consists of subsystem B, the qubit at site $\lfloor N/2 \rfloor+1$, and B', the remaining qubits in the right half with an arbitrary finite number of ancilla.

Consider Hamiltonians of the form $H(t)=K(t)+\overline{K}(t)$, specifying the evolution of the AB system, where K(t) is a two-qubit Hamiltonian supported on systems AB (i.e., the cut edge), while $\overline{K}$ contains terms supported on AA' or BB' but not the cut edge AB. For brevity, we drop the time parameter t even though we allow the Hamiltonian to be time-dependent. We assume that K is expressed in canonical form (2) due to equivalence under local unitaries. Aside from its support, we make no assumptions about the form of $\overline{K}$ (so the resulting bound is more general than nearest-neighbor interactions). We call H satisfying these conditions divisible and also call protocols using divisible Hamiltonians divisible.

Observing that $E_H$ is the supremum over a time derivative of the von Neumann entropy of $\rho = \text{Tr}_B(|\psi\rangle\langle\psi|)$, we have $$E_H = \sup_{|\psi\rangle} \text{Tr}\left(-\frac{d\rho}{dt}\log\rho - \rho\frac{d\log\rho}{dt}\right) \quad (42)$$

$$= \sup_{|\psi\rangle} \text{Tr}\left(-\frac{d\rho}{dt}\log\rho\right). \quad (43)$$

The reduced density matrix $\rho$ has time evolution $$\frac{d\rho}{dt} = -i\text{Tr}_B([H, |\psi\rangle\langle\psi|]). \quad (44)$$

We substitute $H=\overline{K}+\Sigma_{j \in \{x,y,z\}} \mu_j \sigma_j \otimes \sigma_j$ in the commutator and substitute the time-dependence of $\rho$ into (43). By linearity of the trace and sublinearity of the supremum, we get $$E_H \leq E_{\overline{K}} + \Sigma_{j \in \{x,y,z\}} \mu_j E_{\sigma_j \otimes \sigma_j} \leq \alpha, \quad (45)$$

where we observe that $E_{\overline{K}}=0$ since $\overline{K}$ does not have support across the cut, and use the normalization condition $\Sigma_j |\mu_j| \leq 1$. This bound holds for all divisible Hamiltonians H, with nearest-neighbor Hamiltonians as a special case.

The entanglement generated by any divisible protocol can now be bounded in time. We observe that if the protocol contains local measurements then these cannot increase entanglement $E(|\psi\rangle)$ and that feedback may be viewed as a particular time-dependence of H conditioned on measurement outcomes. Therefore, (45) bounds the total increase in entanglement across bipartition AB over a time t* by $$E(|\psi(t^*)\rangle) - E(|\psi(0)\rangle) \leq \alpha t^* \quad (46)$$

for any initial state $|\psi(0)\rangle$ acted on by a divisible protocol and LOCC.

Finally, we give an explicit bound on the worst-case time of divisible state reversal protocols by specifying an initial state. Let the system start in the product state $|\varphi\rangle_A \otimes |\varphi\rangle_B$ where each qubit forms a Bell state with a local ancilla not part of the chain. Clearly, $E(|\varphi\rangle_A \otimes |\varphi\rangle_B)=0$. We perform a reversal R on the chain and get the state $|\psi\rangle_{AB}:=R(|\varphi\rangle_A \otimes |\varphi\rangle_B)$, which is maximally entangled, i.e., $E(|\psi\rangle_{AB})=N$. Then, (46) gives the bound $$t^* \geq \frac{E(|\psi\rangle_{AB}) - E(|\phi\rangle_A \otimes |\phi\rangle_B)}{\alpha} \geq \frac{N}{\alpha} \quad (47)$$

on any divisible state reversal protocol. Comparing this to our protocol time (3), we have $$\frac{t_N}{t^*} \leq \frac{\alpha\pi\sqrt{(N+1)^2 - p(N)}}{4N} \leq \frac{\alpha\pi(1+1/N)}{4}.$$

Comparative Example

Time-Dependent Protocol for Reversal follows.

In this Comparative Example, an analysis of a time-dependent protocol for state reversal is provided using our methods. Here, we prove that the time-dependent protocol satisfies Lemma 3. Lemma 4 and Theorem 2 are then automatically satisfied. First, re-introduce the protocol using our notation.

Protocol S1. Let $H_h := H(0,1)$ and $H_J := H(1,0)$, where $1 = (1, 1, \ldots, 1)$ and $0 = (0, 0, \ldots, 0)$.

Explicitly, $$H_h = \sum_{k=1}^{N} Z_k, \quad (47)$$

$$H_J = X_1 + \sum_{k=1}^{N-1} X_k X_{k+1} + X_N \quad (48)$$

Apply the following unitary to the input state:

$$V := \left(e^{i\frac{\pi}{4}H_h} e^{i\frac{\pi}{4}H_J}\right)^{N+1}$$

Extend the chain with two ancillary sites $\{0, N+1\}$ that constitute the edge $E$. The unitary $V$ extends to an operator $$\tilde{V} := \mathbb{1}_E \otimes V$$

on the extended chain. The following lemma holds.

Lemma S2. The operation $\tilde{V}$ acts on the Majorana operators as $$\tilde{V}\gamma_k \tilde{V}^\dagger \begin{cases} \gamma_k & \text{if } k = 0, 2N+3, \\ (-1)^{k-1}\gamma_{2N+3-k} & \text{otherwise} \end{cases} \quad (49)$$

(with edge state $|++\rangle_E$), alternating $\pi/4$ evolutions under $\tilde{H}_2$, $\tilde{H}_1$ are applied a total of $2N+2$ times. Each step braids neighboring Jordan-Wigner Majoranas as indicated by the arrows; the right-movers keep the same sign while the left-movers gain a minus sign. The edge Majoranas $\gamma_0, \gamma_7$ are unchanged (a feature that ensures the correct parity phases), while the intermediate Majoranas undergo reversal of position with alternating sign. The final state in the bulk of the chain is $|ba\rangle_{12}$.

Proof. Use Eq. (27) to write $V$ as a product of alternating $\pi/4$-rotations under two Hamiltonians $$\tilde{H}_J = i\Sigma_{k=0}^{N} \gamma_{2k+1} \gamma_{2k+2} \text{ and}$$

$$\tilde{H}_h = i\Sigma_{k=1}^{N} \gamma_{2k}\gamma_{2k+1}.$$

Figure 5:
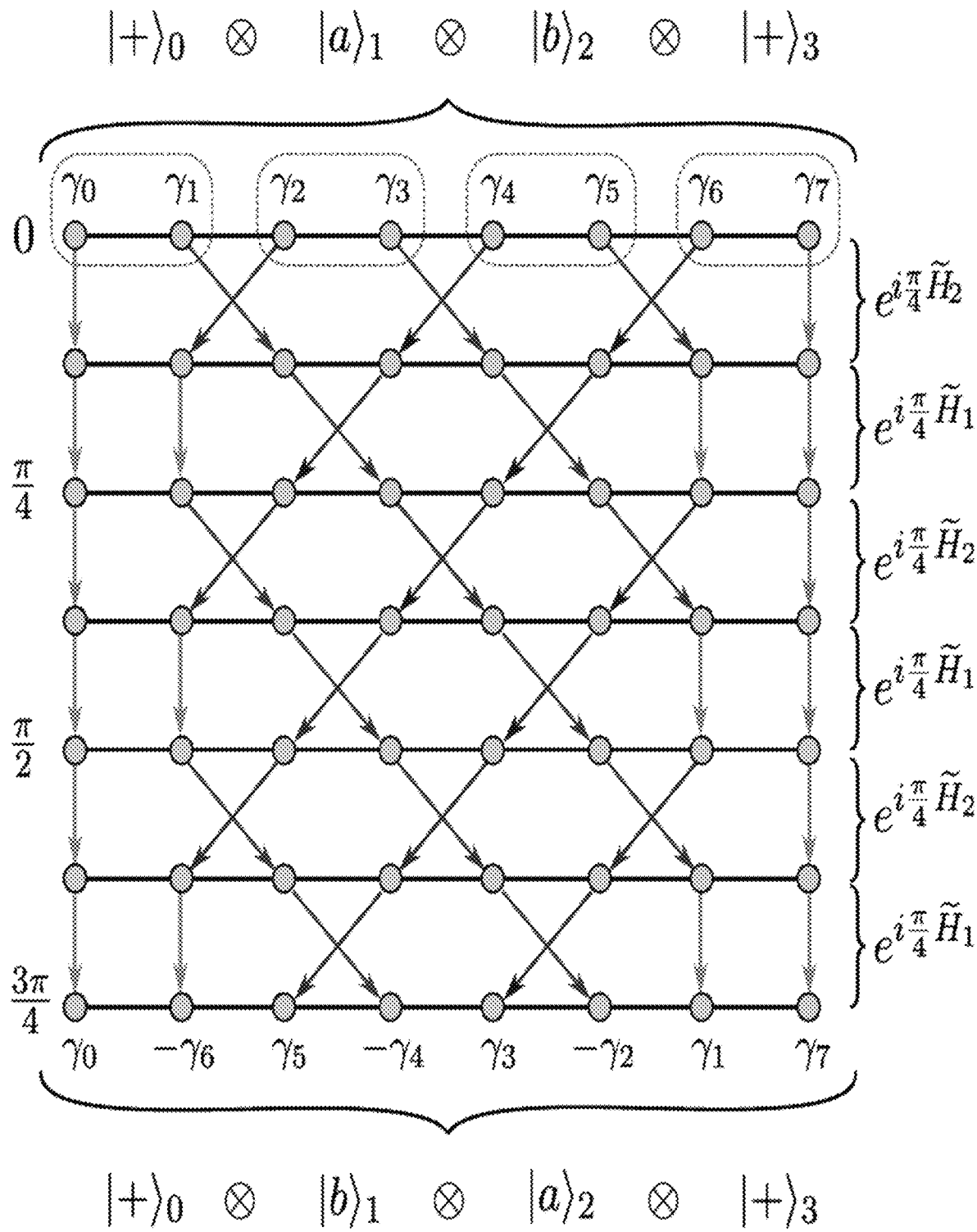
FIG. 5 shows, according to the Comparative Example, a time-dependent reversal protocol for N=2 with two edge ancillas. For any bulk state $|ab\rangle_{12} \cdot$(with edge state $|++\rangle_E$), alternating $\pi/4$ evolutions under $\tilde{H}_2 \cdot \tilde{H}_1$ are applied a total of 2N+2 times. Each step braids neighboring Jordan-Wigner Majoranas, wherein the right-movers (red) keep the same sign while the left-movers (blue) gain a minus sign. The edge Majoranas $\gamma_0$, $\gamma_7$ are unchanged for correct parity phases, and intermediate Majoranas undergo reversal of position with alternating sign. The final state in the bulk of the chain is $|ba\rangle_{12}$.

Since $e^{-\pi/4\gamma_i\gamma_j}$ is a braiding unitary that maps $\gamma_i \to \gamma_j$, $\gamma_j \to -\gamma_i$, $\gamma_{k \neq i,j} \to \gamma_k$, it follows that the operator $$e^{i\frac{\pi}{4}\tilde{H}_h}$$

braids nearest-neighbor Majoranas along all odd edges of the chain, except the first and last edge, while $$e^{i\frac{\pi}{4}\tilde{H}_J}$$

braids along the even edges. Therefore, alternating $\pi/4$ rotations under $\tilde{H}_J$ and $\tilde{H}_h$ implement an even-odd sort on the chain, as shown in FIG. 5. Accounting for sign changes, the Majoranas map as follows: $\gamma_k \to (-1)^{k+1}\gamma_{2N+3-k}$, while $\gamma_0$, $\gamma_{2N+3}$ remain unchanged.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A process for performing state reversal on a quantum spin chain, the process comprising:
    providing a plurality of qubits that are arranged in a quantum spin chain and in an input state, the quantum spin chain of qubits comprising an arbitrary number N of the qubits, such that the quantum spin chain comprises:
        a first terminal qubit disposed at a first terminus of the quantum spin chain;
        a second terminal qubit disposed at a second terminus of the quantum spin chain; and
        one or more intermediate qubits interposed between the first terminal qubit and the second terminal qubit along the quantum spin chain, such that:
            the qubits independently comprise a transverse field strength $h_k$;
            the first terminal qubit comprises a first longitudinal field strength $J_0$;
            the second terminal qubit comprises a second longitudinal field strength $J_N$; and
            for each nearest neighbor qubit pair, the nearest neighbor qubit pair independently comprises an Ising coupling strength $J_k$, wherein for the Ising coupling strength $J_k$, k is an integer from 1 to N−1, and N is the total number of qubits;
    evolving the quantum spin chain from the input state to a final state for an evolution period $t_N$ to perform state reversal on the quantum spin chain; and
    subjecting the qubits to a reversal Hamiltonian H;
    wherein the reversal Hamiltonian H comprises terms for the first longitudinal field strength $J_0$, the Ising coupling strength $J_k$, the second longitudinal field strength $J_N$, and the transverse field strength $h_k$; and
    wherein the reversal Hamiltonian H further comprises $$H(J, h) = J_0 \sigma_x^1 + \sum_{k=1}^{N-1} J_k \sigma_x^k \sigma_x^{k+1} + J_N \sigma_x^N - \sum_{k=1}^{N} h_k \sigma_z^k$$

that includes the terms for the first longitudinal field strength $J_0$, the Ising coupling strength $J_k$, the second longitudinal field strength $J_N$, and the transverse field strength $h_k$.

2. The process of claim 1, wherein, in the reversal Hamiltonian H, the Ising coupling strengths and longitudinal fields $J_k$ comprise $J_k = \alpha_{2k+1}$.

3. The process of claim 2, wherein, in the reversal Hamiltonian H, the transverse field strength $h_k$ comprises $h_k = \alpha_{2k}$.

4. The process of claim 3, wherein, in the reversal Hamiltonian H, $$a_k = \pi \frac{\sqrt{(N+1)^2 - (N+1-k)^2}}{4 t_N},$$

where $$t_N := \pi \sqrt{(N+1)^2 - p(N)}/4$$

and p(N):=N(mod 2).

5. The process of claim 1, wherein, in the reversal Hamiltonian H, the Ising coupling strengths and the longitudinal fields $J_k$ comprise $$J_k^{(m)} = \frac{\pi}{4} \sqrt{(2k+1+4m)(2N+1-2k+4m)}.$$

6. The process of claim 2, wherein, in the reversal Hamiltonian H, the transverse field strength $h_k$ comprises $$h_k^{(m)} = \pi \sqrt{k(N+1-k)}.$$

7. The process of claim 1, wherein state reversal reverses the input state on the quantum spin chain about a central intermediate qubit of the quantum spin chain during evolution period $t_N$.

8. The process of claim 7, wherein each qubit further comprises a single-qubit quantum state $\psi$.

9. The process of claim 8, wherein, in the input state, the order of the single-qubit states $\psi$ in the qubits along the quantum spin chain is $\psi_1, \ldots, \psi_N$.

10. The process of claim 8, wherein, in the final state, the order of the single-qubit quantum states $\psi$ in the qubits is reversed along the quantum spin chain from the input state and is $\psi_N, \ldots, \psi_1$.

11. The process of claim 1, wherein each qubit comprises a superconducting qubit, a neutral atom, a photon, an ion, or an electron.

12. The process of claim 1, wherein the quantum spin chain is disposed on a wafer.

13. The process of claim 1, wherein the state reversal Hamiltonian consists essentially of nearest-neighbor interactions among qubits in an absence of long-range interactions among qubits.

14. The process of claim 1, wherein the state reversal Hamiltonian is time-independent.

15. The process of claim 1, wherein the execution time of state reversal is optimized.

16. The process of claim 1, wherein the execution time of state reversal is within 1.502(1+1/N) of optimal time t*.

* * * * *